United States Patent [19]

Chen et al.

[11] Patent Number: 5,964,935
[45] Date of Patent: Oct. 12, 1999

[54] INITIATOR-TREATED PIGMENT PARTICLES AND METHOD FOR PREPARING SAME

[75] Inventors: Jing Hong Chen, Bethlehem, Pa.; Frederic E. Schubert, Shoreham, N.Y.

[73] Assignee: Copytele, Inc., Huntington Station, N.Y.

[21] Appl. No.: 08/916,895

[22] Filed: Aug. 22, 1997

[51] Int. Cl.$^6$ ..................................................... C09C 1/62
[52] U.S. Cl. ..................... 106/401; 106/400; 106/403; 106/413; 106/417; 106/429; 106/445; 106/447; 106/460; 106/471; 106/476; 106/487; 106/491; 106/493; 106/499; 428/403; 428/407
[58] Field of Search ..................... 106/400, 401, 106/403, 413, 417, 429, 445, 447, 460, 471, 476, 487, 491, 493, 499; 428/403, 407

[56] References Cited

U.S. PATENT DOCUMENTS

| | | | |
|---|---|---|---|
| 4,093,534 | 6/1978 | Carter et al. | 359/296 |
| 4,285,801 | 8/1981 | Chiang | 252/62.53 |
| 4,298,448 | 11/1981 | Muller et al. | 359/296 |
| 4,655,897 | 4/1987 | DiSanto et al. | 359/296 |
| 4,732,830 | 3/1988 | DiSanto et al. | 430/20 |
| 5,190,586 | 3/1993 | Mizuguchi et al. | 106/499 |
| 5,281,561 | 1/1994 | Lin | 106/31.65 |
| 5,380,362 | 1/1995 | Schubert | 106/493 |
| 5,403,518 | 4/1995 | Schubert | 252/572 |
| 5,411,656 | 5/1995 | Schubert | 345/107 |

OTHER PUBLICATIONS

Murau, et al., "The Understanding and Elimination of Some Suspension Instabilities in an Electrophoretic Display", Jour. of App. Phy.. vol. 49, No. 9., Sep. 1978.

Primary Examiner—Mark L. Bell
Assistant Examiner—Scott L. Hertzog
Attorney, Agent, or Firm—Arthur L. Plevy

[57] ABSTRACT

Initiator-treated pigment particles for use in making polymer coated pigment particles, are made up of a plurality of pigment particles. Each of the pigment particles has an outer surface that is covered with a coating of initiator material. The initiator material operates as a nucleus for initiating polymerization on the surface of the particle. The initiator-treated pigment particles are made by providing a plurality of pigment particles and applying a coating of initiator material to the outer surface of each pigment particle.

20 Claims, 1 Drawing Sheet

INITIATOR-TREATED PIGMENT PARTICLES AND METHOD FOR PREPARING SAME

FIELD OF THE INVENTION

The present invention relates generally to coating of pigment particles with polymers and more particularly, to pigment particles pretreated with polymerization initiators and method for preparing same.

BACKGROUND OF THE INVENTION

The electrophoretic effect is well known in the art as evidenced by the many patents and articles which describe the effect. As one of ordinary skill in the art will recognize, the electrophoretic effect operates on the principle that certain particles suspended in a medium can be electrically charged and thereby caused to migrate through the medium to an electrode of opposite charge. Electrostatic printing and electrophoretic image displays (EPID) use the electrophoretic effect to produce desired images. For an example of devices using the electrophoretic effect, reference is made to U.S. Pat. No. 4,732,830, issued to Frank J. DiSanto et al., on Mar. 22, 1988, entitled ELECTROPHORETIC DISPLAY PANELS AND ASSOCIATED METHODS, and assigned to Copytele, Inc., the assignee herein.

In typical EPIDs, dielectric particles are suspended in a fluid medium that is either clear or of an optically-contrasting color as compared with the dielectric particles. To effect the greatest optical contrast between the particles and the suspension medium, it is desirable to have either light-colored particles suspended in a dark medium or dark-colored particles, preferably black, suspended in a backlighted clear medium. A variety of pigment particle and dispersion medium compositions are known in the art. See, for example, U.S. Pat. No. 4,298,444, issued to K. Muller, et al., on Nov. 3, 1981, entitled ELECTROPHORETIC DISPLAY.

It has been found difficult to produce black and other very dark colored electrophoretic particles that are dielectric, of uniform size, and have a density matching that of a common suspension medium. As a result, EPIDs commonly use readily-manufactured light colored electrophoretic pigment particles suspended in media which contain dark color dyes. Such EPIDs are exemplified in U.S. Pat. Nos. 4,655,897 to DiSanto et al.; 4,093,534 to Carter et al.; 4,298,448 to Muller et al.; and 4,285,801 to Chiang. The use of a yellow pigment particle is disclosed in the following patents, all of which issued to Frederic E. Schubert and are assigned to Copytele, Inc., the assignee herein: U.S. Pat. No. 5,380,362, issued Jan. 10, 1995, entitled SUSPENSION FOR USE IN ELECTROPHORETIC IMAGE DISPLAY SYSTEMS; U.S. Pat. No. 5,403,518, issued Apr. 4, 1995, entitled FORMULATIONS FOR IMPROVED ELECTROPHORETIC DISPLAY SUSPENSIONS AND RELATED METHODS; and U.S. Pat. No. 5,411,656, issued May 2, 1995, entitled GAS ABSORPTION ADDITIVES FOR ELECTROPHORETIC SUSPENSIONS. These three patents are incorporated herein by reference.

The selection of the electrophoretic particles used in the EPID is very important in determining performance of the EPID and the quality of the image produced. Ideally, electrophoretic particles should have an optimum charge-to-mass ratio, which is dependent upon the particle size and surface charge; the optimum charge-to-mass ratio is desirable to obtain good electrostatic deposition at high velocity as well as rapid reversal of particle motion when voltages change.

There are advantages to polymerically coating electrophoretic particles for use in the EPID or other electrophoretic devices. A polymer coating applied to the particles can have the effect of enhancing the ability of the particles to scatter light. When polymer-coated particles impinge upon a transparent screen electrode (thereby displacing the fluid medium from the screen), a brighter color and sharper image is produced (as compared with when uncoated particles are used). Additionally, it naturally is desirable to use electrophoretic particles that are stable and resistant to interaction with the suspension medium to improve the efficiency and life-time of the EPID; the suspension medium may comprise, for example, aromatic or aliphatic solvents, including benzenes, toluenes, hydrocarbon oil, nonane, decane, or the like, which may interact over time with some typical uncoated pigment particles used in EPIDs. Polymer-coated pigment particles produce a harder and more solvent-resistant composite when compared to uncoated particles.

Furthermore, polymer-coated electrophoretic particles can be less apt to adhere to surfaces within the electrophoretic cell. Over recent years, attention has been directed to dispersion stabilization by adsorbed polymers on particle surfaces. See, for example, an article by P. Murau and B Singer, appearing in Vol 49, No. 9, of the Journal of Applied Physics (1978), entitled "The Understanding and Elimination of Some Suspension Instabilities in an Electrophoretic Display." See also U.S. Pat. No. 5,403,518, issued to Schubert, referenced above, and U.S. Pat. No. 4,285,801, issued to Anne A. Chiang on August 25, 1981, entitled ELECTROPHORETIC DISPLAY COMPOSITION.

It has been discovered that fluoro-polymers are advantageous for use as pigment particle coatings, as they have low critical surface tensions which tend to produce anti-stick properties. See, for example, an article by M. Hudlicry and A. E. Pavlath, appearing in Vol. 187, page 983, of ACS Monograph (1995), entitled "Properties of Fluorinated Compounds II." The lower surface tensions of perfluorinated polymers, when used as a pigment particle coatings, leads to less interaction between the pigment particle surfaces and the solvents comprising the suspension medium in which the particles are dispersed. The stabilizing polymer molecule hydrocarbon chains are more apt to extend out into the solvent and not sit on the particle surface because of its anti-stick character. This enhances the efficiency of the stabilizing mechanism.

There are, however, manufacturing problems associated with coating pigment particles. These problems involve the inability to coat all the pigment particles in a batch with a polymer and the formation of a percentage of polymer particles that have no pigment core.

Accordingly, a need exists for a method which enables all the pigment particles in a batch to be polymer coated while preventing the formation of polymer particles having no pigment core.

SUMMARY OF THE INVENTION

Initiator-treated pigment particles which are for use in manufacturing polymer-coated pigment particles. The initiator-treated pigment particles comprise a plurality of pigment particles each having an outer surface which is covered with a coating of initiator material that operates as a nucleus for initiating polymerization on the surface of the particle.

The method used to make initiator-treated pigment particles described above comprise the steps of providing a plurality of pigment particles and applying a coating of initiator material to the outer surface of each pigment particle.

BRIEF DESCRIPTION OF THE DRAWING

For a detailed understanding of the present invention, reference should be made to the following detailed description taken in conjunction with the accompanying drawings wherein.

DETAILED DESCRIPTION OF THE INVENTION

As will become apparent, the initiator-treated pigment particles of the present invention are especially useful for making electrophoretic particles used in electrophoretic image displays (EPIDs). Accordingly, the initiator-treated pigment particles of the present invention will be described in connection with their use in making electrophoretic particles. It should be understood, however, that the initiator-treated pigment particles are also useful in many different applications where dispersions containing charged particles are desired, such as paint, ink, and electrostatic toner.

The initiator treated particles of this invention have the advantage of being at least as stable as or more stable than the pure initiator material. This is possible because the individual initiator molecules are distributed in a thin surface layer on the pigment particle as will be explained further on. While individual molecules can still undergo deactivation reactions on the surface of the particle, reactions will not propagate through the sample as they can in the bulk material. Providing pigment particles that are all polymer-coated will enhance the operation of an EPID since, all the pigment particles in the EPID will have the enhanced ability to scatter light to produce a brighter color; are harder, more solvent-resistant composites; and are adhesion-resistant with regard to surfaces within the electrophoretic cell.

Figure 1:
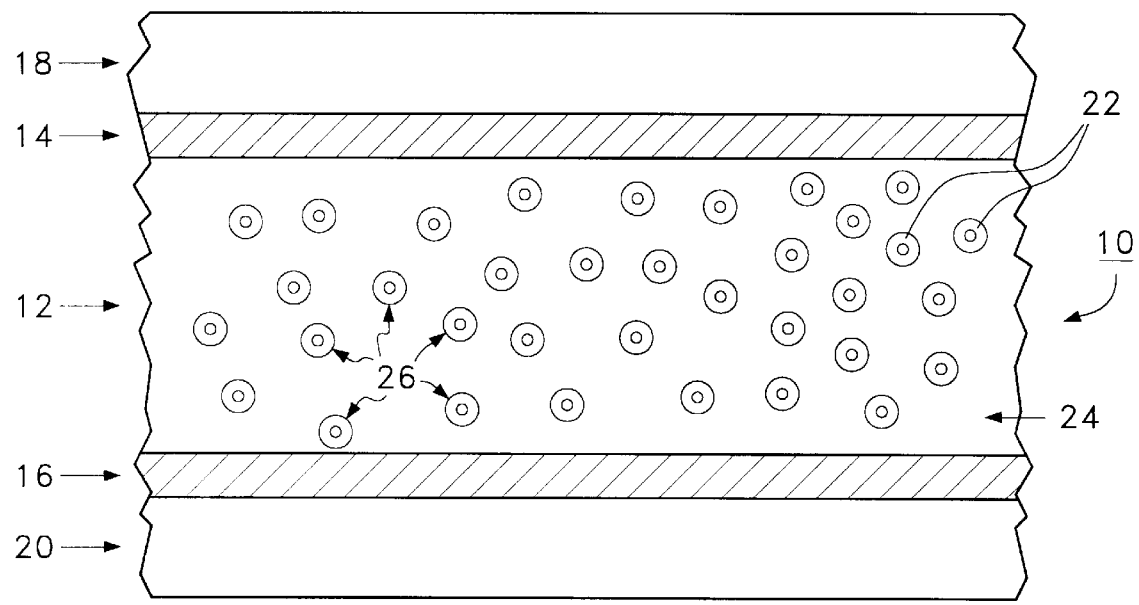
FIG. 1 is a diagrammatic, cross-sectional view of an EPID having particles in accordance with the present invention

To fully appreciate the initiator-coated pigment particles of the present invention, a brief description of an EPID is provided as follows with reference to FIG. 1 which depicts a cross-sectional view through a segment of a simple EPID 10 enlarged to show a single pixel. As will be recognized by a person skilled in the art, an EPID comprises an anode 14 and a cathode 16 with a volume of an electrophoretic dispersion 12 disposed therebetween. The anode 14 and the cathode 16 are deposited upon glass plates 18, 20 in the form of a thin layer of indium-tin-oxide (ITO) or a like compound. The ITO layer is deposited in such a manner as to be substantially transparent when viewed through the glass plates 18, 20.

The electrophoretic dispersion 12 is comprised of a plurality of polymer-coated dielectric electrophoretic particles 22 suspended in a fluid medium 24. When a sufficient electrical bias is applied between the anode 14 and the cathode 16, the particles 22 migrate to either the cathode 16 or anode 14, depending on polarity, and they displace the dark color medium adjacent the ITO layer, thereby creating a bright pixel. Reversing the voltage produces a dark pixel.

Figure 2:
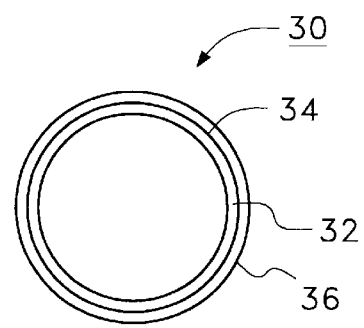
FIG. 2 is cross-sectional view through an initiator-treated particle of the present invention.

Referring now to FIG. 2, a cross-sectional view through an initiator-treated particle 30 is shown. The particle 30 comprises a core pigment particle 32 having an outer surface 34 which is coated by a layer 36 of initiator material. The outer surface 34 coated with the initiator material 36, serves as a nucleus for polymerization to initiate on the outer surface 34. Accordingly, the initiator-treated pigment particles of the present invention are produced prior to polymerization of the pigment particles.

The initiator-treated particles are prepared according to the present invention by the following process. First, pigment particles are selected, cleaned and dried using conventional techniques. The pigment particles are then dispersed in a solvent containing a dispersing agent and an initiator material. The dispersing agent disperses and thus, separates and suspends the particles in the solvent so that all the particles can be coated with the initiator. This produces a mixture of pigment, solvent, and initiator.

Next, the mixture is sonicated for approximately 20 minutes using a Sonicor Model 1150 Ultrasonic Probe or like device. After sonication, the mixture is placed in an evaporator and the solvent is evaporated at room temperature. Once the solvent has evaporated, all that remains are the initiator-treated particles of the present invention. This process typically yields greater than 95% pigment particles which are initiator-treated.

Table I below provides an exemplary formulation for making the initiator-treated particles of the present invention:

TABLE I

| Materials | Weight (grams) |
| --- | --- |
| Pigment | 1.2–1.4 |
| Initiator | 0.02–0.10 |
| Wetting Agent (for pigment) | 3.0–5.0 |
| Solvent | 30.0–35.0 |

Pigment particles which can be treated in accordance with the present invention comprise light and dark colored, inorganic pigments, organic pigments, and various particles produced from polymers, dyes and the like. Examples of light and dark colored inorganic and organic pigments include titanium dioxide, zinc oxide, zinc sulfide, silica, calcium silicate, alumina hydrate, carbon black, iron oxide black, lamp black, Zn Fe Cr brown Spinel, Magnesium Ferrite, Chreen Spinel, Cr oxide Green, Diarylide Yellow, Arylide Yellow, Hansa Yellow, Benzidine Yellow, Perinone Orange, Diarylide Orange, Ultramarine Blue, Indanthrone Blue, Ultramarine Blue Dixoazine Violet, Quinacridone Violet, Anthraquinoid Red, and Perylene Red and the like.

The polymerization initiator used in the present invention is selected from azo-initiators, photo-initiators, organic peroxides and the like. A preferred polymerization initiator is 4,4'-Azobis (4-cyanovaleric acid). Other polymerization initiators include 2,2"-azobis (2-methyl-butyrontrile), benzoyl peroxide, lauroyl peroxide, octanoyl peroxide, and the like.

The solvent used in the process of the present invention is selected from various aromatic hydrocarbons, aliphatic hydrocarbons, dioxane and dichloromethane. The aromatic hydrocarbon solvents preferably include benzene, toluene, xylene, or tertiary butyl benzene. The aliphatic hydrocarbon solvents preferably include hexane or decane.

The dispersing agent used in the process of the present invention is selected from alkyl hydrocarbons or commercial dispersing agents. The preferred dispersing agents are alkyl hydrocarbons with functional groups —OH and —NH$_2$.

The initiator-treated particles of the present invention are useful in coating pigment particles with one or more solid coatings of polypentaflurostyrene, polystyrene-divinyl benzene and the like. Moreover, the initiator-treated particles of the present invention can be used to produce porous polymer-coated pigment particles.

It will be understood that the embodiments described herein are merely exemplary and that a person skilled in the art may make many variations and modifications to the described embodiments utilizing functionally equivalent elements to those described. Any variations or modifications to the invention described hereinabove are intended to be included within the scope of the invention as defined by the appended claims.

What is claimed is:

1. Initiator-treated pigment particles for use in manufacturing polymer-coated pigment particles, comprising:
   a plurality of pigment particles each having an outer surface which is covered with a coating of initiator material that operates as a nucleus for initiating polymerization on said surface of said particle.

2. The initiator-treated pigment particles of claim 1, wherein said plurality of pigment particles are selected from the group consisting of inorganic pigment particles, organic pigment particles, polymer pigment particles, and dye pigment particles.

3. The initiator-treated pigment particles of claim 1, wherein said coating initiator-material is selected from the group consisting of azo-initiators, photo-initiators, and organic peroxides.

4. The initiator-treated pigment particles of claim 1, wherein said polymer-coated pigment particles comprise dielectric electrophoretic particles.

5. A method of making initiator-treated pigment particles for use in manufacturing polymer-coated pigment particles, said method comprising the steps of:
   providing a plurality of pigment particles, each of said particles having an outer surface and
   applying a coating of initiator material to said outer surface of each of said plurality of pigment particles, said coating of initiator material operating as a nucleus for initiating polymerization on said surface of said particle.

6. The method of making initiator-treated pigment particles according to claim 5, wherein said initiator-material is selected from the group consisting of azo-initiators, photo-initiators, and organic peroxides.

7. The method of making initiator-treated pigment particles according to claim 5, wherein said plurality of pigment particles are selected from the group consisting of inorganic pigment particles, organic pigment particles, polymer pigment particles, and dye pigment particles.

8. The method of making initiator-treated pigment particles according to claim 5, wherein said step of applying includes the step of dispersing said plurality of pigment particles in a solvent to form a mixture.

9. The method of making initiator-treated pigment particles according to claim 8, wherein said solvent is selected from the group consisting of aromatic hydrocarbons, aliphatic hydrocarbons, dioxane and dichloromethane.

10. The method of making initiator-treated pigment particles according to claim 8, wherein said solvent includes a dispersing agent for dispersing said plurality of pigment particles in said solvent.

11. The method of making initiator-treated pigment particles according to claim 10, wherein said dispersing agent comprises an alkyl hydrocarbon.

12. The method of making initiator-treated pigment particles according to claim 11, wherein said alkyl hydrocarbon has a functional group selected from the group consisting of —OH functional groups and —$NH_2$ functional groups.

13. The method of making initiator-treated pigment particles according to claim 8, wherein said solvent includes said initiator-material.

14. The method of making initiator-treated pigment particles according to claim 8, wherein said step of applying further includes the step of sonicating said mixture.

15. The method of making initiator-treated pigment particles according to claim 14, wherein said step of applying further includes the step of evaporating said solvent from said mixture after said step of sonicating.

16. The method of making initiator-treated pigment particles according to claim 8, wherein said step of applying further includes the step of evaporating said solvent from said mixture.

17. A formulation for initiator-treated pigment particles that are used for manufacturing polymer-coated pigment particles, comprising:
   a solvent;
   a wetting agent for pigment;
   a polymerization initiator dissolved in said solvent; and
   a plurality of pigment particles dispersed in said solvent with the assistance of said wetting agent.

18. The formulation of claim 17, wherein said solvent is selected from the group consisting of aromatic hydrocarbons, aliphatic hydrocarbons, dioxane and dichloromethane.

19. The formulation of claim 17, wherein said initiator-material is selected from the group consisting of azo-initiators, photo-initiators, and organic peroxides.

20. The formulation of claim 17, wherein said plurality of pigment particles are selected from the group consisting of inorganic pigment particles, organic pigment particles, polymer pigment particles, and dye pigment particles.

* * * * *